United States Patent
Allag et al.

(10) Patent No.: US 12,489,151 B2
(45) Date of Patent: *Dec. 2, 2025

(54) POWER BALANCING FOR COMMUNICATIONS

(71) Applicant: TEXAS INSTRUMENTS INCORPORATED, Dallas, TX (US)

(72) Inventors: Tahar Allag, Irving, TX (US); Kyl Wayne Scott, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,047

(22) Filed: Jan. 3, 2024

(65) Prior Publication Data

US 2024/0136603 A1 Apr. 25, 2024

Related U.S. Application Data

(63) Continuation of application No. 17/463,157, filed on Aug. 31, 2021, now Pat. No. 11,901,518.

(51) Int. Cl.
*H01M 10/42* (2006.01)
*H01M 10/48* (2006.01)

(52) U.S. Cl.
CPC ....... *H01M 10/425* (2013.01); *H01M 10/482* (2013.01); *H01M 2010/4271* (2013.01); *H01M 2010/4278* (2013.01); *H01M 2220/20* (2013.01)

(58) Field of Classification Search
CPC ............ H01M 10/425; H01M 10/482; H01M 2010/4271; H01M 2010/4278; H01M 2220/20; H02J 7/0047; H02J 7/00032
See application file for complete search history.

(56) References Cited

U.S. PATENT DOCUMENTS

| | | | |
|---|---|---|---|
| 7,869,718 B1* | 1/2011 | Sao | G08C 23/04 398/151 |
| 10,990,116 B2* | 4/2021 | Nakai | G06F 1/28 |
| 2015/0309095 A1* | 10/2015 | Monnerie | G01R 21/133 702/60 |

FOREIGN PATENT DOCUMENTS

CN 107452992 B 3/2020

OTHER PUBLICATIONS

Nakai and et al. "A review on overall control of DC microgrids," 2019, Journal of Energy Storage, vol. 21, pp. 113-138 (Year: 2019).*
International PCT Search Report dated Jan. 31, 2023.

* cited by examiner

*Primary Examiner* — Douglas Kay
(74) *Attorney, Agent, or Firm* — Frank D. Cimino

(57) ABSTRACT

A method includes receiving, by a first device in a stack, a command from a controller. The stack includes multiple devices. The method also includes dissipating, by the first device, an amount of power responsive to a difference between a longest response time for the devices to respond to the command, and a device response time for the first device to respond to the command.

20 Claims, 6 Drawing Sheets

POWER BALANCING FOR COMMUNICATIONS

CROSS-REFERENCE TO RELATED APPLICATIONS

This application is a continuation of application Ser. No. 17/463,157 filed Aug. 31, 2021, which is incorporated herein by reference in its entirety.

BACKGROUND

A battery pack includes multiple battery modules connected in series. Such battery packs provide power for electronic devices, such as electric vehicles (EVs), among other devices.

SUMMARY

In an example of this description, a method includes a method includes receiving, by a first device in a stack, a command from a controller. The stack includes multiple devices. The method also includes dissipating, by the first device, an amount of power responsive to a difference between a longest response time for the devices to respond to the command, and a device response time for the first device to respond to the command.

In another example of this description, a device is a device in a stack that includes multiple devices. The device includes a communication interface configured to receive a command from a controller, and a processor coupled to the communication interface. The processor is configured to cause the device to dissipate an amount of power responsive to a difference between a longest response time for the devices to respond to the command, and a device response time for the device to respond to the command.

In yet another example of this description, a system includes a battery management controller, a stack of battery monitors coupled to the battery management controller. The stack includes a first battery monitor and a second battery monitor. The first and second battery monitors are configured to receive a command from the battery management controller. The first battery monitor is configured to dissipate an amount of power responsive to a difference between a longest response time for the first and second battery monitors to respond to the command, and a device response time for the first battery monitor to respond to the command.

DETAILED DESCRIPTION

Figure 1:
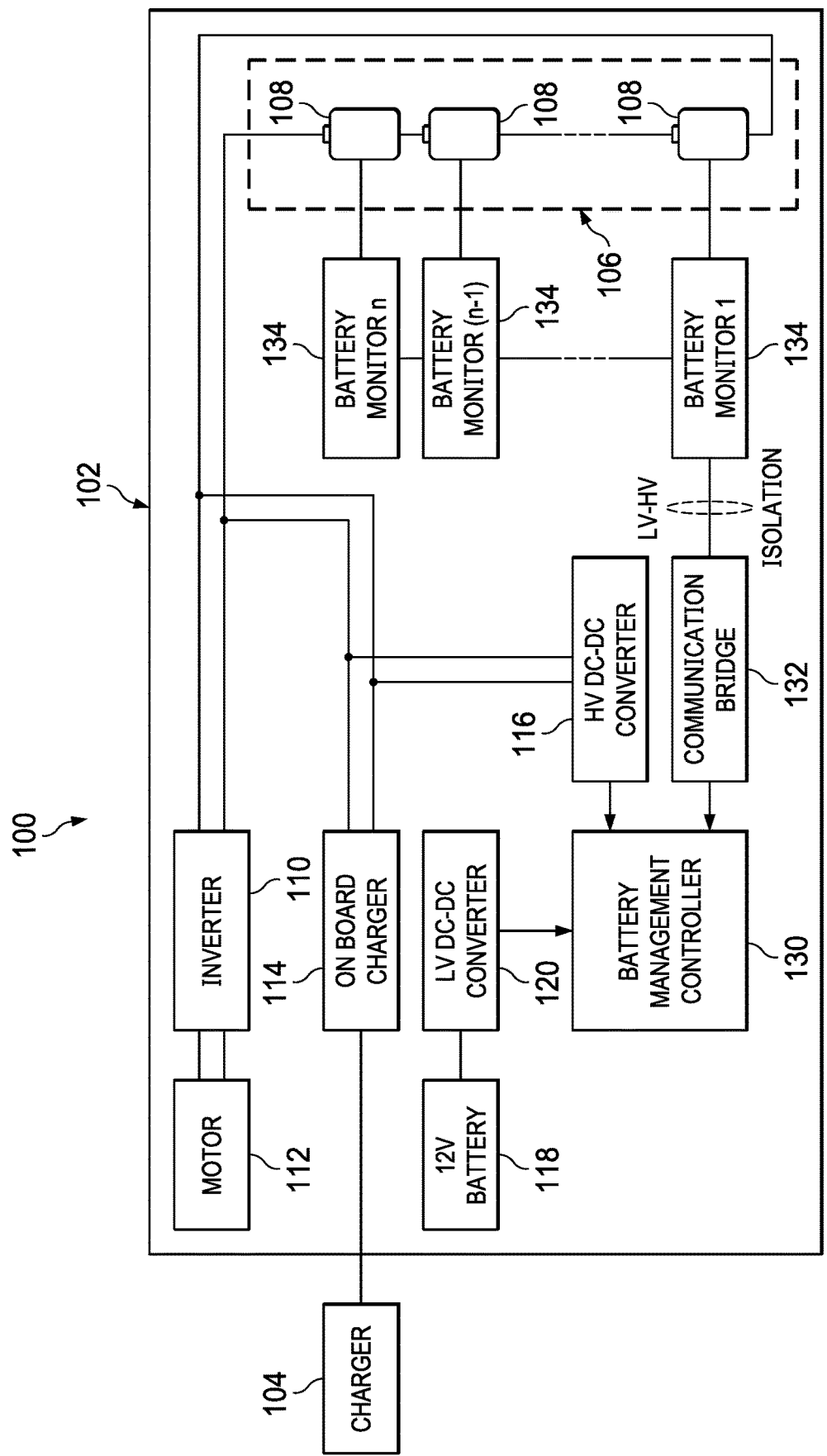
FIG. 1 is a block diagram of a system including a battery management system (BMS) in accordance with an example of this description.

A battery management system (BMS) obtains data related to battery modules of a battery pack, and controls the battery modules of the battery pack. For example, the BMS controls charging of the battery modules, performs power balancing between the battery modules, and monitors the operating conditions and/or health of the battery modules. The BMS includes multiple battery monitors, and each battery module is coupled to one of the battery monitors. The BMS also includes a battery management controller that is coupled to, and communicates with, each of the battery monitors. Together, the battery monitors and the battery management controller facilitate the monitoring of various parameters of the battery modules, such as voltage, current, temperature, and parameters related to cell balancing within a module, among other functions of the BMS.

As described, the battery modules are connected in series. The battery monitors are coupled to the battery management controller in a daisy-chain manner. The battery monitors are arranged as devices in a stack, with a top device in the stack being farthest from the battery management controller (e.g., an end device farther away from the battery management controller), and a bottom device in the stack being nearest to the battery management controller (e.g., an end device nearer to the battery management controller). For example, a communication from the battery management controller to the top device in the stack, or the battery monitor farthest from the battery management controller, first passes through the other devices, or battery monitors, in the stack. Similarly, a response from the top device in the stack passes through the other devices in the stack before being provided to the battery management controller.

Each battery monitor consumes an amount of power (e.g., from the battery module to which the battery monitor is coupled) to drive communication signals. Such communications occur regularly while the electronic device (e.g., EV) is operating. It is useful to balance an amount of power consumed from the battery modules over time, such as to improve the health and/or monitoring accuracy of the battery pack. However, battery monitors at different positions in the stack consume different amounts of power for a same communication command or response, which imbalances the power consumption of the battery modules.

Examples of this description address the foregoing by a device (e.g., a battery monitor) in a stack being configured to dissipate an additional amount of power (e.g., greater than the amount of power dissipated by driving a communication signal) responsive to a difference between an amount of time for that battery monitor to respond to a command, and a longest amount of time for all of the battery monitors in the stack to respond to the command.

For example, the battery management controller provides a stack read command to the stack of battery monitors. The stack read command is useful to read a value (e.g., a battery module voltage) from each of the battery monitors in the stack. Because of the daisy-chain communications between the battery monitors, the stack read command is passed from the battery monitor at the bottom of the stack to the battery monitor at the top of the stack. The battery monitor at the top of the stack then provides its response to the stack read command to the next-lowest battery monitor. The next-lowest battery monitor adds its response to the stack read command to the top-of-stack response, and this process continues until the battery monitor at the bottom of the stack adds its response to the stack read command to the cumulative response of the other battery monitors in the stack.

For a stack having n battery monitors and the above stack read command example, the response time of the bottom-of-stack battery monitor is approximately n times the response time of the top-of-stack battery monitor. The power consumed driving a communication signal is proportional to the duration of the communication. Thus, in the stack read command example, the top-of-stack battery monitor is configured to dissipate an additional amount of power proportional to the difference between its response time and the longest response time (e.g., the bottom-of-stack response time, which is n times the response time of the top-of-stack battery monitor). Accordingly, the battery monitors each consume an approximately equal amount of power during stack communications, which improves the balance of power consumed from the battery modules in the battery pack. These and other examples are described below with reference to the accompanying figures.

FIG. 1 is a block diagram of a system 100 including a BMS in accordance with an example of this description. The system 100 includes an electronic device 102 (e.g., an EV 102) that is adapted to be coupled to an external power source 104, such as an EV charging station 104. The EV 102 includes a battery pack 106, which includes n battery modules 108 connected in series. An inverter 110 is coupled to the battery pack 106, and is configured to receive a direct current (DC) input voltage from the battery pack 106, and to provide an alternating current (AC) output voltage to a load 112, such as a motor 112 of the EV 102, responsive to the DC input voltage.

The EV 102 also includes an on-board charger 114 that is coupled to the battery pack 106. The on-board charger 114 is adapted to be coupled to the external power source or charger 104. The on-board charger 114 is configured to convert an input voltage provided by the external charger 104 (e.g., either an AC voltage or a DC voltage) to an output voltage suitable for charging the battery pack 106 (e.g., a DC voltage).

In some examples, the EV 102 includes a high-voltage (HV) DC-DC power converter 116 that is coupled to the battery pack 106. The HV DC-DC power converter 116 is configured to convert the DC voltage provided by the battery pack 106 to a DC voltage usable by various other components of the EV 102 (e.g., a lower DC voltage). The EV 102 also includes a low-voltage (LV) battery 118, such as a 12-volt (V) battery, an 18 V battery, a 40 V battery, or the like. In examples in which the EV 102 includes a LV battery 118, the EV 102 also includes a LV DC-DC power converter 120 coupled to the LV battery 118. The LV DC-DC power converter 116 is configured to convert the DC voltage provided by the LV battery 118 to a DC voltage usable by various other components of the EV 102 (e.g., a lower DC voltage, such as 5 V).

As described, the EV 102 includes a BMS to obtain data related to the battery modules 108 of the battery pack 106, and to control the modules 108 of the battery pack 106. For example, the BMS controls charging of the battery modules 108, performs power balancing between the battery modules 108, and monitors the operating conditions and/or health of the battery modules 108. In the example of FIG. 1, the BMS includes a battery management controller 130, a communication bridge device 132, and a stack of battery monitors 134. Each of the battery monitors 134 is associated with, and coupled to, one of the battery modules 108. Accordingly, in the example of FIG. 1, there are n battery monitors 134, each coupled to one of the n battery modules 108. In examples of this description, the battery monitors 134 are referred to as being arranged as devices in a stack, with a top battery monitor 134 (e.g., monitor n) being farthest away from the battery management controller 130, and a bottom battery monitor 134 (e.g., monitor 1) being nearest to the battery management controller 130.

The communication bridge device 132 couples the battery management controller 130 to the stack of battery monitors 134. In an example, the communication bridge device 132 is configured to receive a communication (e.g., a command and/or a request) from the battery management controller 130 using a first communication protocol (e.g., universal asynchronous receiver-transmitter (UART)), and to provide the communication to the stack of battery monitors 134 using a second communication protocol (e.g., different than UART). Similarly, the communication bridge device 132 is configured to receive a communication (e.g., a response) from the stack of battery monitors 134 using the second communication protocol, and to provide the response to the battery management controller 130 using the first communication protocol.

As described, the battery management controller 130 is coupled to the stack of battery monitors 134, and is configured to communicate with the battery monitors 134 (e.g., through the communication bridge device 132). Accordingly, the battery management controller 130 and the battery monitors 134 enable monitoring of various parameters of the battery modules 108, such as voltage, current, temperature, and parameters related to cell balancing within a module, among other functions of the BMS.

Figure 2:
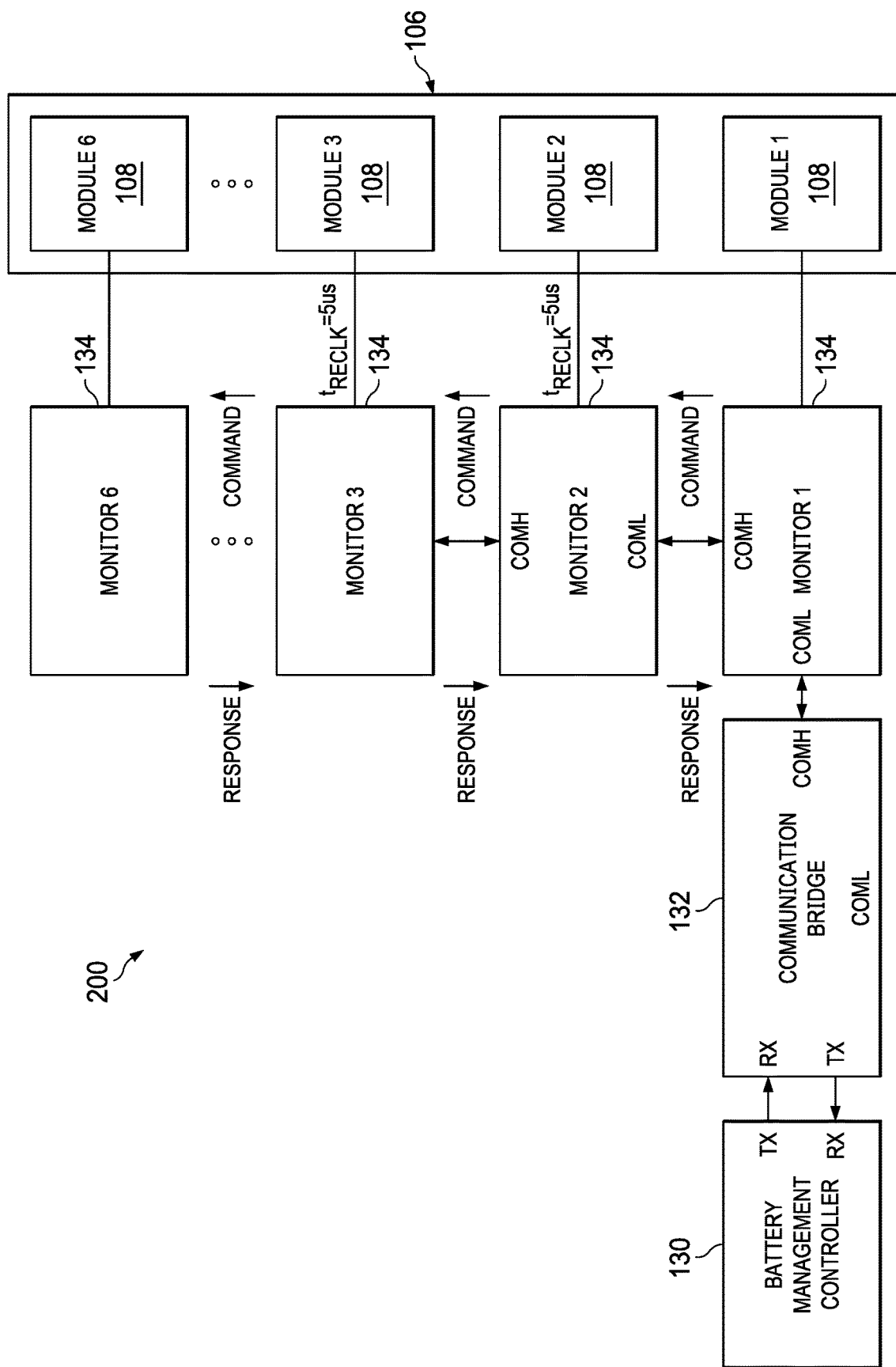
FIG. 2 is a block diagram of a BMS in accordance with an example of this description.

FIG. 2 is a block diagram of a BMS 200, including the battery management controller 130, the communication bridge device 132, and the stack of battery monitors 134 in accordance with an example of this description. The BMS 200 is coupled to the battery pack 106. Specifically, each of the battery monitors 134 (e.g., monitors 1-6 in FIG. 2) is coupled to one of the battery modules 108 (e.g., modules 1-6 in FIG. 2) of the battery pack 106.

The battery monitors 134 are configured to communicate in a daisy-chain manner, in which each command or request from the battery management controller 130 is passed from the bottom of the stack of battery monitors 134 (e.g., monitor 1) to the top of the stack of battery monitors 134 (e.g., monitor 6). A subsequent response, if warranted (e.g., responsive to a request from the battery management controller 130) is passed from the top of the stack of battery monitors 134, or a highest responding battery monitor 134 in the stack of battery monitors 134, to the bottom of the stack of battery monitors 134, and then back to the battery management controller 130.

In this example, the battery monitors 134 are stack devices that are connected using a vertical interface, in which a command is received from a COML port, and is forwarded to an upstream device (e.g., battery monitor 134) through a COMH port. A response from an upstream device is received from the COMH port, and is forwarded to a downstream device through the COML port. As shown, the communication bridge device 132 is configured to communicate with the battery management controller 130 (e.g., a UART communication protocol) through a transmit (TX)-receive (RX) interface, and to communicate with the stack of battery monitors 134 through the vertical COMH-COML interface.

In an example, each battery monitor 134 introduces a re-clock time ($t_{RECLK}$), or delay, to communications that are forwarded in either direction. In the examples of this description $t_{RECLK}$ is equal to 5 microseconds (us), although $t_{RECLK}$ can be other values in other examples.

Each battery monitor 134 consumes an amount of power (e.g., from the battery module 108 to which the battery monitor 134 is coupled) to drive communication signals, such as passing a command up the stack of battery monitors 134, or passing a response down the stack of battery monitors 134. As described, it is useful to balance an amount of power consumed from the battery modules 108 over time, such as to improve the health and/or monitoring accuracy of the battery pack 106. In some cases, however, battery monitors 134 at different positions in the stack consume different amounts of power for a same communication command or response, which imbalances the power consumption of the battery modules 108.

As described, examples of this description include a device (e.g., battery monitor 134) in the stack that is configured to dissipate an additional amount of power (e.g., greater than the amount of power dissipated by driving a communication signal) responsive to a difference between an amount of time for that battery monitor 134 to respond to a command, and a longest amount of time for all of the battery monitors 134 in the stack to respond to the command.

These and other examples are described below, with reference to a stack read command, and a single device read command, each of which is issued by the battery management controller 130 to the stack of battery monitors 134. A stack read is a command issued to the stack of battery monitors 134 to read one or more registers (e.g., a battery module 108 voltage) of each of the battery monitors 134. A single device read is a command issued to the stack of battery monitors 134 to read one or more registers of one of the battery monitors 134 specified by the single device read command Although these commands are provided to show functionality of the examples of this description, the examples of this description are not limited to these command types (or the resulting response(s)).

Figure 3:
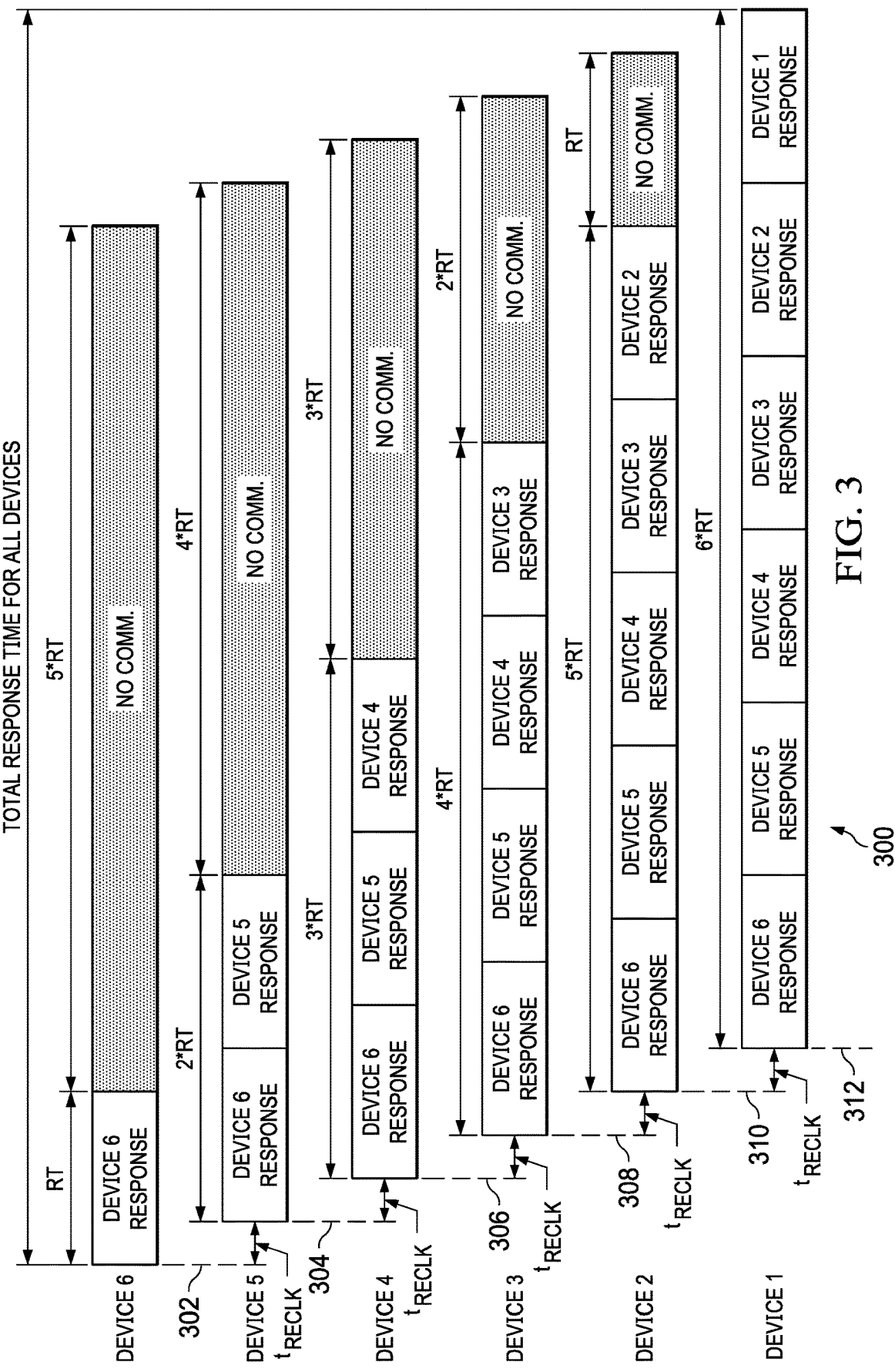
FIG. 3 is a timing diagram of response times of devices in a stack, such as battery monitors of a BMS, in accordance with an example of this description.

FIG. 3 is a timing diagram 300 of response times of devices in a stack, such as the battery monitors 134 described above, in accordance with an example of this description. The responses in the timing diagram 300 are responsive to a stack read, in which each of the battery monitors 134 provides a value of one or more of its registers in the response. In the example of FIG. 3, Device 1 corresponds to the function of bottom-of-stack battery monitor 134 of FIG. 2 (e.g., monitor 1), Device 6 corresponds to the function of top-of-stack battery monitor 134 of FIG. 2 (e.g. monitor 6), and Devices 2-5 correspond to the function of intermediate battery monitors 134 of FIG. 2 (e.g., monitors 2-5), respectively.

In the example of FIG. 3, the battery management controller 130 provides the stack read command to the stack of battery monitors 134 through the communication bridge device 132. Because of the daisy-chain communications between the battery monitors 134, the stack read command is passed from Device 1 to Device 6. Before time 302, the stack read command reaches Device 6.

At time 302, Device 6 begins to provide its response to the stack read command to the next-lowest downstream device, Device 5. In this example, the duration of the response of each battery monitor 134 is equal, and is shown in FIG. 3 as "RT" for response time, which is the Device 6 response time.

A time period between the time 302 and time 304 is the Device 5 re-clock time ($t_{RECLK}$). Accordingly, at time 304, Device 5 begins to provide the Device 6 response to the next-lowest downstream device, Device 4, and appends its own response following the Device 6 response. The Device 5 response time is thus 2*RT.

A time period between the time 304 and time 306 is the Device 4 re-clock time ($t_{RECLK}$). Accordingly, at time 306, Device 4 begins to provide the Device 6 and Device 5 responses to the next-lowest downstream device, Device 3, and appends its own response following the Device 5 response. The Device 4 response time is thus 3*RT.

A time period between the time 306 and time 308 is the Device 3 re-clock time ($t_{RECLK}$). Accordingly, at time 308, Device 3 begins to provide the Device 6-Device 4 responses to the next-lowest downstream device, Device 2, and appends its own response following the Device 4 response. The Device 3 response time is thus 4*RT.

A time period between the time 308 and time 310 is the Device 2 re-clock time ($t_{RECLK}$). Accordingly, at time 310, Device 2 begins to provide the Device 6-Device 3 responses to the next-lowest downstream device, Device 1, and appends its own response following the Device 3 response. The Device 2 response time is thus 5*RT.

Finally, a time period between the time 310 and time 312 is the Device 1 re-clock time ($t_{RECLK}$). Accordingly, at time 312, Device 1 begins to provide the Device 6-Device 2 responses to the next-lowest downstream device, which is the communication bridge device 132, and appends its own response following the Device 2 response. The Device 1 response time is thus 6*RT, and is the longest response time of any of the devices (e.g., battery monitors 134). The communication bridge device 132 provides the cumulative response of the battery monitors 134 to the stack read command to the battery management controller 130.

Figure 4:
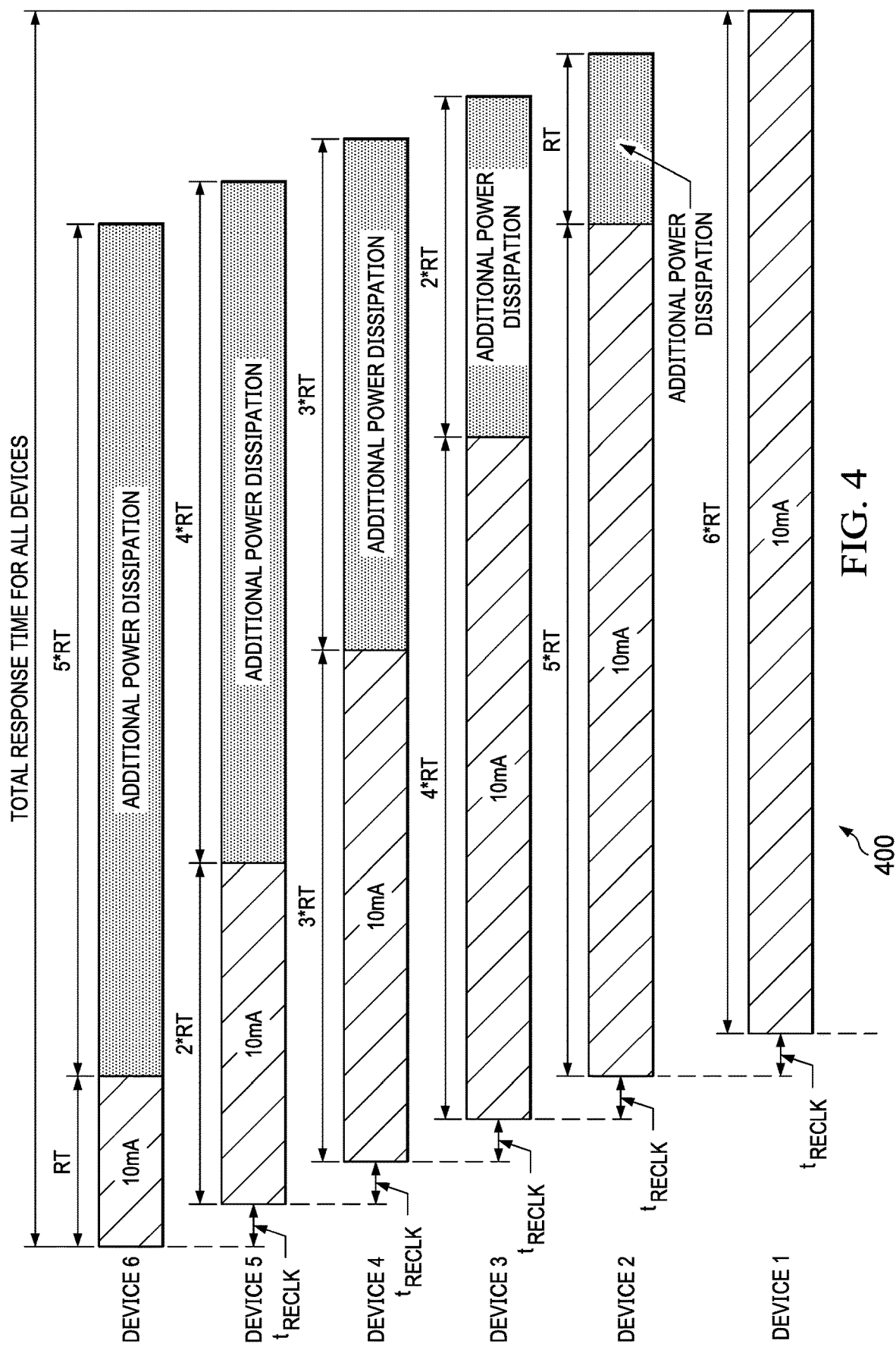
FIG. 4 is a power consumption diagram corresponding to the timing diagram of FIG. 3 in accordance with an example of this description.

FIG. 4 is a power consumption diagram 400 corresponding to the timing diagram 300 of FIG. 3 in accordance with an example of this description. The timing of FIG. 4 is similar to that of FIG. 3 and is not described again for brevity. As described above, the power consumed by a device (e.g., battery monitor 134) to drive a communication signal is proportional to the duration of the communication signal. For the purposes of simplicity, the following examples refer to power dissipation as being measured by a device's 134 current consumption over an amount of time. In these examples, a device consumes 10 milliamps (mA) of current for one response time, RT. Also, a device that consumes 10 mA of current for 2*RT dissipates approximately the same power as a device that consumes 20 mA of current for 1*RT. Thus, in the stack read command example of FIG. 3, Device 1 consumes 10 mA for 6*RT, whereas Device 6 consumes 10 mA for 1*RT. The other Devices 2-5 consume similarly-proportional amounts of current. This is an example of a command/communication that causes the power consumption imbalance across the battery modules 108, described above. The numerical examples of current and/or power consumption in this description are for illustrative purposes, and do not limit the scope of the described examples to any particular such numerical values.

The power consumption diagram 400 shows that Devices 2-6 are configured to dissipate an additional amount of power, which is proportional to the difference between that Device's response time and the longest response time (e.g., the Device 1 response time, which is 6*RT). For example, because Device 6 consumes 10 mA of current for 1*RT driving its communication signal, and Device 1 consumes 10 mA of current for 6*RT driving its communication signal, Device 6 is configured to dissipate an additional amount of power proportional to 10 mA of current for 5*RT (e.g., 6*RT−RT). In an example, each of the Devices 1-6 includes a configurable register that specifies an amount of power or current to be dissipated.

Similarly, because Device 5 consumes 10 mA of current for 2*RT driving its communication signal, Device 5 is configured to dissipate an additional amount of power proportional to 10 mA of current for 4*RT (e.g., 6*RT−2*RT). Continuing this approach, Device 4 is configured to dissipate an additional amount of power proportional to 10 mA of current for 3*RT; Device 3 is configured to dissipate an additional amount of power proportional to 10 mA of current for 2*RT; and Device 2 is configured to dissipate an additional amount of power proportional to 10 mA of current for RT. Because Device 1 is the device responsible for the longest response time, Device 1 does not dissipate any additional power/current. Accordingly, the devices (e.g., battery monitors 134) each consume an approximately equal amount of power during stack response communications, which improves the balance of power consumed from the battery modules 108 in the battery pack 106.

Figure 5:
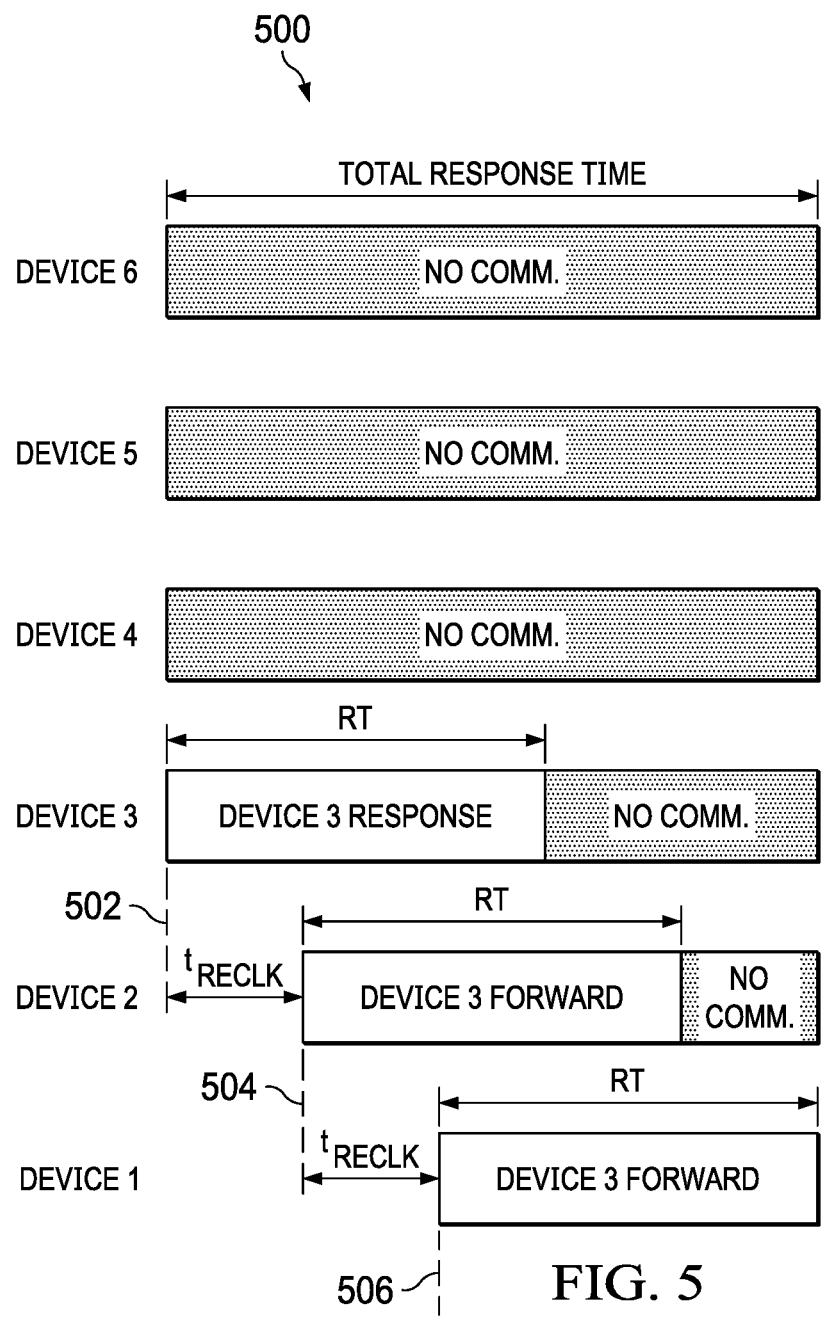
FIG. 5 is a timing diagram of another example of response times of devices in a stack, such as battery monitors of a BMS, in accordance with an example of this description.

FIG. 5 is a timing diagram 500 of response times of devices in a stack, such as the battery monitors 134 described above, in accordance with an example of this description. The responses in the timing diagram 500 are responsive to a single device read, in which a specified one of the battery monitors 134 provides a value of one or more of its registers in the response. The Devices 1-6 in the example of FIG. 5 correspond to the Devices 1-6 in the example of FIG. 3.

In the example of FIG. 5, the battery management controller 130 provides the single device read command to the stack of battery monitors 134 through the communication bridge device 132. The single device read command specifies, or is directed to, Device 3. Because of the daisy-chain communications between the battery monitors 134, the single device read command is passed from Device 1 to Device 6, irrespective of the device specified by the stack read command. However, because the command in this example is a single device read command directed to Device 3, Devices 4-6 do not respond to the command, and thus Device 3 begins to respond after providing the command to Device 4. Accordingly, before time 502, Device 3 has provided the command to Device 4, and Devices 4-6 can ignore the single device read command.

Accordingly, at time 502, because the single device read command is directed to Device 3 and Device 3 has already passed the command up the stack to Device 4, Device 3 begins to provide its response to the next-lowest downstream device, Device 2. As above, the duration of the response for Device 3 is shown as "RT" for response time.

A time period between the time 502 and time 504 is the Device 2 re-clock time ($t_{RECLK}$). Accordingly, at time 504, Device 2 begins to forward the Device 3 response to the next-lowest downstream device, Device 1. In this example, Device 2 does not append any additional response because the single device read is only directed to Device 3. The Device 2 response time is thus RT.

Finally, a time period between the time 504 and time 506 is the Device 1 re-clock time ($t_{RECLK}$). Accordingly, at time 506, Device 1 begins to forward the Device 3 response to the next-lowest downstream device, which is the communication bridge device 132. In this example, Device 1 does not append any additional response because the single device read is only directed to Device 3. The Device 1 response time is thus RT, and the longest response time of any of the devices (e.g., battery monitors 134) is also RT, which is the response time of each of Devices 1-3. The communication bridge device 132 provides the response of the battery monitors 134 to the single device read command to the battery management controller 130.

Figure 6:
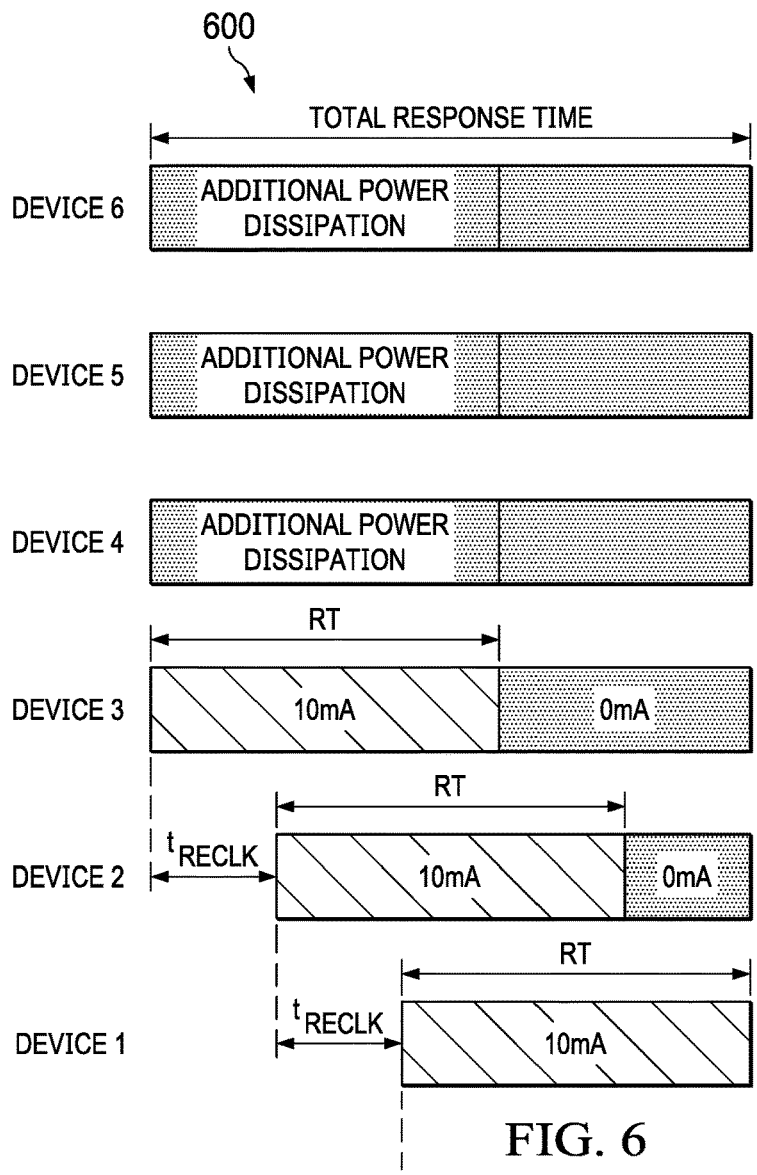
FIG. 6 is a power consumption diagram corresponding to the timing diagram of FIG. 5 in accordance with an example of this description.

FIG. 6 is a power consumption diagram 600 corresponding to the timing diagram 500 of FIG. 5 in accordance with an example of this description. The timing of FIG. 6 is similar to that of FIG. 5 and is not described again for brevity. As described above, the power consumed by a device (e.g., battery monitor 134) to drive a communication signal is proportional to the duration of the communication signal. In these examples, a device consumes 10 mA of current for one response time, RT. Thus, in the single device read command example of FIG. 5, Devices 1-3 each consume 10 mA for 1*RT, whereas Devices 4-6 each consume 0 mA. This is another example of a command/communication that causes the power consumption imbalance across the battery modules 108, described above.

The power consumption diagram 600 shows that Devices 4-6 are configured to dissipate an additional amount of power, which is proportional to the difference between that device's response time (e.g., 0) and the longest response time (e.g., any of the Devices 1-3 response time, which is RT). For example, because Device 6 consumes 0 mA of current driving its communication signal, and Device 1 consumes 10 mA of current for 1*RT driving its communication signal, Device 6 is configured to dissipate an additional amount of power proportional to 10 mA of current for 1*RT.

Continuing this approach, Device 4 and Device 5 are also configured to dissipate an additional amount of power proportional to 10 mA of current for 1*RT. Because Devices 1-3 are the devices responsible for the longest response time, Devices 1-3 do not dissipate any additional current. Accordingly, each of the devices (e.g., battery monitors 134) consumes an approximately equal amount of power during stack response communications, which improves the balance of power consumed from the battery modules 108 in the battery pack 106.

The above examples which generally address power balancing during response communications. Also, the top-of-stack device (e.g., battery monitor 134) does not forward a command received from a downstream device, whereas each of the other devices in the stack forwards such a command to an upstream device. In this case, the top-of-stack device consumes less power during command communications as well. Thus, the top-of-stack device is configured to dissipate an additional amount of power that is proportional to a forwarding time for the command. Accordingly, the devices (e.g., battery monitors 134), including the top-of-stack device, each consumes an approximately equal amount of power during command communications as well.

In an example, each of the stack devices, such as Devices 1-6 in the examples of FIGS. 3-6, includes a configurable register that specifies an amount of additional power or current to be dissipated by that device. For example, referring to the stack read command of FIGS. 3 and 4, the register of each device includes a value that specifies 10 mA, which corresponds to the amount of current consumed per RT. Then, each device dissipates an amount of power responsive to the register value and the difference in the longest device response time, and that device's response time, for a particular command. For example, in FIG. 4, Device 6's register includes the value that specifies 10 mA, its response time is RT, and the longest device response time is 6*RT. Accordingly, Device 6 dissipates additional power by consuming current of 10 mA*(6*RT−RT). As another example, in FIG. 6, Device 6's register includes the value that specifies 10 mA, its response time is 0, and the longest device response time is RT. Accordingly, Device 6 dissipates additional power by consuming current of 10 mA*(RT−0).

In some examples, the stack devices do not consume a same amount of power during communications (e.g., driving communication signals). For example, power consumption can vary during communication depending on external components that isolate one stack device from another, such as a transformer, a capacitor only, a capacitor-plus-choke arrangement, and the like. In these examples, the configurable register of certain devices can specify different amounts of additional power or current to be dissipated by that device. For example, referring to the stack read command of FIGS. 3 and 4, Device 6 only consumes 5 mA of current to drive a communication signal per RT. The remaining Devices 1-5 consume current as described above. Accordingly, to balance Device 6 power consumption with that of Devices 1-5 (which are balanced to dissipate power proportional to 10 mA of current for 6*RT as described above), Device 6's register includes the value that specifies 11 mA per RT, its response time, and the longest device response time is 6*RT. Accordingly, Device 6 dissipates an additional amount of power proportional to 11 mA of current for 5*RT (e.g., 6*RT−RT). Device 6 thus dissipates a total amount of power proportional to 5 mA of current for 1*RT consumed during Device 6 communication, summed with the additional 11 mA of current for 5*RT. Accordingly, Device 6 power consumption is balanced with that of the remaining Devices 1-5, despite Device 6 consuming a different amount of power during communications relative to Devices 1-5.

In another example, the bottom-of-stack device (e.g., Device 1) consumes less current to drive a communication signal per RT. The bottom-of-stack device is not guaranteed additional time after providing its response before a subsequent command can be received from the battery management controller 130. Thus, the devices, such as the bottom-of-stack device, include an additional configurable register that specifies an amount of additional power or current to be dissipated by that device during its own communications. The examples of FIGS. 3-6 generally refer to dissipating additional power after the device's communication has occurred (if at all). However, because the bottom-of-stack device is not guaranteed additional time after its communication, the devices are also configurable to dissipate additional power during a communication period in some examples.

The examples described herein are not limited to a particular type of power dissipation unless otherwise stated. In one example, the devices (e.g., battery monitors 134) are configured to dissipate the additional amount of power by providing a current to an internal load of the device. In another example, the devices (e.g., battery monitors 134) are configured to dissipate the additional amount of power by providing a "dummy" communication to the communication interface (e.g., to another battery monitor 134 or to the communication bridge device 132). Such dummy communications include data that is recognizable as arbitrary, or is otherwise able to be ignored, such as by the battery management controller 130. Because power is dissipated by driving communication signals, causing certain devices to drive dummy communications results in those devices dissipating additional power in accordance with the examples described above.

Figure 7:
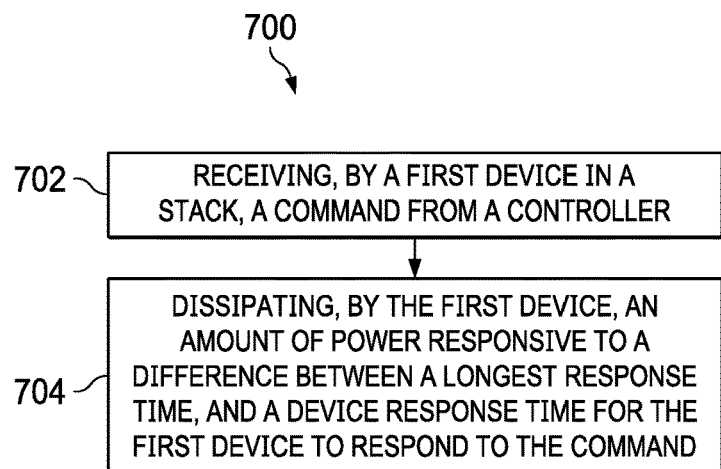
FIG. 7 is a flow chart of a method for power balancing during communications in accordance with an example of this description.

FIG. 7 is a flow chart of a method 700 for power balancing during communications in accordance with an example of this description. The method 700 begins in block 702 with receiving, by a first device in a stack, a command from a controller. The stack includes multiple devices. For example, the first device is one of the battery monitors 134, such as those shown in FIGS. 1 and 2. The first device is thus configured to communicate in a daisy-chain manner with other devices in the stack, in which each command or request from the controller (e.g., battery management controller 130) is passed from the bottom of the stack of devices to the top of the stack of devices. A subsequent response, if warranted (e.g., responsive to a request from the controller) is passed from the top of the stack device, or a highest responding device in the stack, to the bottom of the stack, and then back to the controller.

The method 700 continues in block 704 with dissipating, by the first device, an amount of power responsive to a difference between a longest response time of the devices in the stack to respond to the command, and a device response time for the first device to respond to the command. In one example, and as described with respect to FIG. 4, certain devices in the stack (e.g., devices 2-6 in FIG. 4) are configured to dissipate an additional amount of power, which is proportional to the difference between that Device's response time and the longest response time (e.g., the Device 1 response time, which is 6*RT in FIG. 4). For example, because Device 6 consumes 10 mA of current for 1*RT driving its communication signal, and Device 1 consumes 10 mA of current for 6*RT driving its communication signal, Device 6 is configured to dissipate an additional amount of power proportional to 10 mA of current for 5*RT. In an example, each of the Devices 1-6 includes a configurable register that specifies an amount of power or current to be dissipated.

Accordingly, the method 700 enables the devices (e.g., battery monitors) to each consume an approximately equal amount of power during stack communications, which improves the balance of power consumed from the battery modules in the battery pack.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims

What is claimed is:

1. A system, comprising:
a controller;
a communication bridge coupled to the controller;
a first battery monitor device coupled to the communication bridge; and
a second battery monitor device coupled to the first battery monitor device;
wherein:
the first battery monitor device is capable of dissipating a first amount of power in response to a command to send battery data;
the second battery monitor device is capable of dissipating a second amount of power and an additional third amount of power in response to the command; and
the third amount of power is based on the first amount of power.

2. The system of claim 1, wherein:
the third amount of power is based on a difference between the first amount of power and the second amount of power.

3. The system of claim 1, wherein:
the second amount of power and the third amount of power are equal to the first amount of power.

4. The system of claim 1, wherein:
the communication bridge is capable of receiving the command from the controller using a first communication protocol; and
the communication bridge is capable of transmitting the command to the first battery monitor device using a second communication protocol.

5. The system of claim 4, wherein:
the first communication protocol is universal asynchronous receiver transmitter (UART).

6. The system of claim 1, wherein:
the first battery monitor device and the second battery monitor device are serially coupled.

7. The system of claim 1, wherein:
the first battery monitor device and the second battery monitor device are configured in a stack;
the first battery monitor device is at a bottom position in the stack; and
the second battery monitor device is at a top position in the stack.

8. The system of claim 1, wherein:
the first battery monitor device is capable of receiving the command on a COML port and forward the command to the second battery monitor device on a COMH port; and
the first battery monitor device is capable of receiving a response to the command from the second battery monitor device on the COMH port and forward the response to the communication bridge on the COML port.

9. The system of claim 1, further comprising:
a first battery coupled to the first battery monitor device;
a second battery coupled serially to the first battery; and
the second battery coupled to the second battery monitor device.

10. The system of claim 1, further comprising:
a vehicle coupled to the controller, the communication bridge, the first battery monitor device, and the second battery monitor device.

11. A system comprising:
a plurality of battery monitor devices coupled in series; and
a controller coupled to the plurality of battery monitor devices;
wherein:
a first battery monitor device of the plurality of battery monitor devices is capable of receiving from the controller a command to send battery data, and communicating the command to the plurality of battery monitors;
a last battery monitor device of the plurality of battery monitor devices dissipates a first amount of power responding to the command and also dissipates an additional amount of power; and
the additional amount of power is based on an amount of power dissipated by each other battery monitor device of the plurality of battery monitor devices responding to the command.

12. The system of claim 11, wherein:
the first battery monitor device of the plurality of battery monitor devices dissipates a second amount of power transmitting a response of each of the plurality of battery monitor devices to the controller; and
the second amount of power is approximately equal to the first amount of power and the additional amount of power dissipated by the last battery monitor device.

13. The system of claim 11, further comprising:
a communication bridge coupled between the controller and the plurality of battery monitor devices.

14. The system of claim 13, wherein:
the communication bridge is capable of receiving the command from the controller using a first communication protocol; and
the communication bridge is capable of transmitting the command to the plurality of battery monitor devices using a second communication protocol.

15. The system of claim 14, wherein:
the first communication protocol is universal asynchronous receiver transmitter (UART).

16. The system of claim 11, wherein:
the first battery monitor device of the plurality of battery monitor devices is capable of receiving the command on a COML port and forward the command to a second battery monitor device on a COMH port; and
the first battery monitor device is capable of receiving a response to the command from the second battery monitor device on the COMH port and forward the response to the controller on the COML port.

17. The system of claim 14, wherein:
a delay time period exists between response of each of the plurality of battery monitor devices.

18. A method comprising:
receiving, by a first battery monitor device, a command to send battery data;
transmitting, by the first battery monitor device, the command to a second battery monitor device;
in response to receiving the command, transmitting, by the second battery monitor device, a first response to the first battery monitor device, wherein the transmitting by the second battery monitor device dissipates a first amount of power;
transmitting, by the first battery monitor device, a second response and the first response, wherein the transmitting of the second response and the first response dissipates a second amount of power; and
dissipating, by the second battery monitor device, a third amount of power approximately equal to the second amount of power.

19. The method of claim 18, wherein:
a controller is capable of transmitting the command to the first battery monitor device.

20. The method of claim 19, wherein:
the first battery monitor device is nearer to the controller than the second battery monitor device.

* * * * *